US009599541B2

United States Patent
Boffa et al.

(10) Patent No.: US 9,599,541 B2
(45) Date of Patent: Mar. 21, 2017

(54) METHOD AND APPARATUS FOR CONTROLLING TYRES

(71) Applicant: PIRELLI TYRE S.P.A., Milan (IT)

(72) Inventors: Vincenzo Boffa, Milan (IT); Riccardo Antoj, Milan (IT); Gabriele Pece, Milan (IT); Giuseppe Casadio Tozzi, Imola (IT); Valeriano Ballardini, Imola (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 15/037,874

(22) PCT Filed: Nov. 21, 2014

(86) PCT No.: PCT/IB2014/066243
§ 371 (c)(1),
(2) Date: May 19, 2016

(87) PCT Pub. No.: WO2015/079370
PCT Pub. Date: Jun. 4, 2015

(65) Prior Publication Data
US 2016/0305851 A1    Oct. 20, 2016

(30) Foreign Application Priority Data
Nov. 28, 2013    (IT) .............................. MI2013A1988

(51) Int. Cl.
*G01M 17/02*    (2006.01)
*B29D 30/06*    (2006.01)

(52) U.S. Cl.
CPC ....... *G01M 17/024* (2013.01); *B29D 30/0633* (2013.01); *B29D 2030/0635* (2013.01)

(58) Field of Classification Search
None
See application file for complete search history.

(56) References Cited

U.S. PATENT DOCUMENTS 3,847,012 A * 11/1974 Sperberg ............. G01M 17/022
73/146
8,387,675 B1 * 3/2013 Vaninger ............... B60C 25/138
157/1.17
(Continued)

FOREIGN PATENT DOCUMENTS

DE    29 16 882    11/1980
JP    1-176910    7/1989
(Continued)

OTHER PUBLICATIONS

International Search Report from the European Patent Office for International Application No. PCT/IB2014/066243, mailing date Feb. 2, 2015.
(Continued)

*Primary Examiner* — Andre Allen
(74) *Attorney, Agent, or Firm* — Finnegan, Henderson, Farabow, Garrett & Dunner, L.L.P.

(57) ABSTRACT

An apparatus for controlling tires includes a support plane configured for receiving a tire with axial middle line plane parallel to the support plane, defining an abutted lateral portion and a free lateral portion arranged at a specific height with respect to the support plane. A thrust element is configured for applying, to a measurement surface of the free lateral portion, a force directed toward the support plane. A positioning actuator is operatively associated with the thrust element and configured for moving the thrust element with at least one motion component perpendicular to a rotation axis of the tire. The apparatus also includes devices for modifying the angular position of the measurement surface. A control unit is programmed for detecting a first value of output data at each position of the measurement surface as a function of a first value of input data maintained substantially constant along at least one complete rotation of the measurement surface around the rotation axis and for (Continued)

detecting a second value of the output data at each position of the measurement surface. The second value of the output data corresponds with a second value of the input data maintained substantially constant along at least one complete rotation of the measurement surface. The control unit includes a module programmed for calculating, at each position of the measurement surface, a difference between the second value of the output data and the first value of the output data.

33 Claims, 6 Drawing Sheets

(56) References Cited

U.S. PATENT DOCUMENTS

| | | | |
|---|---|---|---|
| 8,613,303 B1* | 12/2013 | Hanneken | B60C 25/138 |
| | | | 157/1.17 |
| 8,770,254 B1* | 7/2014 | Hanneken | B60C 25/138 |
| | | | 157/1.17 |
| 8,783,326 B1* | 7/2014 | Vaninger | B60C 25/0551 |
| | | | 157/1.17 |
| 9,073,394 B1* | 7/2015 | Clasquin | B60C 25/056 |
| 2006/0272408 A1 | 12/2006 | Matsumoto | |
| 2011/0011170 A1* | 1/2011 | Stalnaker | G01M 17/02 |
| | | | 73/146 |
| 2013/0090879 A1* | 4/2013 | Estor | G06F 17/40 |
| | | | 702/97 |
| 2013/0253686 A1* | 9/2013 | Flament | G01M 17/02 |
| | | | 700/117 |
| 2015/0298514 A1* | 10/2015 | Nicolini | B60C 25/056 |
| | | | 157/1.24 |
| 2016/0075196 A1* | 3/2016 | Corghi | B60C 25/056 |
| | | | 157/1.24 |

FOREIGN PATENT DOCUMENTS

| | | |
|---|---|---|
| JP | 6-78453 | 3/1994 |
| JP | 6-129953 | 5/1994 |
| JP | 2002-62103 | 2/2002 |
| JP | 2006-84310 | 3/2006 |
| JP | 2007-78453 | 3/2007 |
| JP | 2008-190981 | 8/2008 |
| JP | 2009-186274 | 8/2009 |

OTHER PUBLICATIONS

Written Opinion of the International Searching Authority from the European Patent Office for International Application No. PCT/IB2014/066243, mailing date Feb. 2, 2015.

Notice of Reasons for Rejection from the Japanese Patent Office, in counterpart Japanese Application No. 2016-533096 dated Oct. 27, 2016.

* cited by examiner

METHOD AND APPARATUS FOR CONTROLLING TYRES

CROSS REFERENCE TO RELATED APPLICATIONS

This application is a national phase application based on PCT/IB2014/066243, filed Nov. 21, 2014, and claims the priority of Italian Patent Application No. MI2013A001988, filed Nov. 28, 2013, the content of each application being incorporated herein by reference.

BACKGROUND OF THE INVENTION

Field of the Invention

The object of the present invention is a method and an apparatus for controlling tyres.

Description of the Related Art

The tyre production cycles provide for obtaining and/or assembling the various components of a tyre being processed in one or more building lines, and subsequently subjecting the green tyre to a moulding and vulcanisation process adapted to define the structure of the tyre according to a desired geometry and tread pattern.

The tyre, when moulded and vulcanised, is defined by a toroidal structure wound around a rotation axis and substantially symmetric with respect to an axial middle line plane perpendicular to said rotation axis. In particular the toroidal structure comprises a crown portion arranged substantially perpendicular to the axial middle line plane in a radially external zone of the tyre, two anchorage portions arranged in radially internal zones of the tyre, respectively on opposite sides of the axial middle line plane, and two lateral portions that are respectively extended on opposite sides of the axial middle line plane between one of the anchorage portions and the crown portion.

With "axial middle line plane" it is intended a plane perpendicular to the rotation axis equidistant from the axially external portions of the tyre itself. With "crown portion" of the tyre it is intended a portion of the tyre arranged substantially perpendicular to the axial middle line plane, in a radially external zone of the tyre, and corresponding to the tread band and to portions of the belt structure and carcass arranged radially internal with respect to the tread band.

With "anchorage portions" of the tyre, also commonly defined "beads", the radially internal zones of the tyre are intended, respectively arranged on opposite sides of the axial middle line plane, configured in a manner so as to be engaged with the rim of a wheel.

With "lateral portions" of the tyre, portions of the tyre are intended that are respectively extended on axially opposite sides of the axial middle line plane between each of the anchorage portions and the crown portion, corresponding to the sidewalls and to portions of the carcass arranged in axially internal position with respect to the aforesaid sidewalls.

With "abutted lateral portion" and with "free lateral portion" of the tyre it is respectively intended a lateral portion abutted against a support plane and the opposite lateral portion arranged at a specific height from the support plane.

With "measurement surface" it is intended a surface subjected to timely control having limited size with respect to the overall surface of said lateral portions.

With "measurement surfaces arranged in symmetric positions with respect to the axial middle line plane", two measurement surfaces are indicated, each belonging to a lateral portion of the tyre and arranged at the same angular and radial position with respect to the rotation axis thereof.

US2006/0272408 describes a method and an apparatus for measuring the uniformity of the tyre. The method comprises the steps of mounting the tyre on a spindle, pressing a circumferential surface of a rotating drum against the tread surface of the tyre with a first pressing force, rotating the tyre around its axis, and calculating the forces on a first and a second plane of the tyre through calculation means while the tyre is rotating.

JP2008190981 describes a method and a device for measuring the rigidity of the sidewall of a tyre. A flattening force is applied by a pressure roller to a sidewall of a tyre on one side, in order to deform it. The movement on one side of said sidewall of the tyre is measured by measurement means and the rigidity of the sidewall is determined based on these detection and measurement results.

In the known production cycles, for identifying defects, the moulded and vulcanised tyre is subjected to a manual visual control or it can be subjected to an automatic control as is described in the abovementioned document.

One of such manual visual controls is directed towards discarding tyres in which the lateral portion has poor rigidity, i.e. for identifying the so-called "weak sidewall" defect, by sidewall it being intended a lateral portion of the finished tyre.

SUMMARY OF THE INVENTION

The Applicant has observed that the accuracy of the manual controls executed up to now depends significantly on the experience of the operator set to undertake the inspection and has a high level of subjectivity.

The Applicant has verified that the insertion of a more accurate manual control for improving the quality of the finished product would risk excessively increasing the tyre production times.

The Applicant has observed that the use of automatic controls on the tyre, of the type of those illustrated in US2006/0272408 and in JP2008190981, can improve the objectivity of the control itself, but due to the high number of factors at play, precision in measurement and repeatability of the control process cannot be ensured.

The Applicant therefore perceived that arranging the tyre to be controlled on a support plane according to modes that do not change relative to the control to be carried out, and operating on the free lateral portion for equal or different time periods equal with different size forces, could limit all the factors that led to a uncertain repeatability of the controls and to a good outcome of the same.

The Applicant has finally found that arranging a tyre on a support plane, with axial middle line plane substantially parallel to the support plane, and applying at least two forces (or movements) of different size for pre-established time periods, solve the abovementioned problems, limiting the factors that affect the outcome of the control and rendering the latter reliable and repeatable.

More precisely, in accordance with a first aspect, the invention relates to a method for controlling tyres.

Preferably the method comprises: i) arranging a tyre on a support plane with axial middle line plane substantially parallel to the support plane, defining an abutted lateral portion and a free lateral portion arranged at a specific height with respect to said support plane.

Preferably the method comprises: ii) applying, to a measurement surface of the free lateral portion, a force directed towards the support plane.

Preferably the method comprises: iii) modifying the angular position of the measurement surface with respect to a rotation axis of the tyre with regard to the free lateral portion.

Preferably the method comprises: iv) setting a first value of input data corresponding to said force or to said height at each position of the measurement surface, maintaining it substantially constant along at least one complete rotation of the measurement surface around said rotation axis.

Preferably the method comprises: v) detecting a first value of output data at each position of the measurement surface, said output data corresponding to:

said force if said input data is the height of the free lateral portion of the tyre at each position of the measurement surface, or to said height if said input data is the force applied at each position of the measurement surface.

Preferably the method comprises: vi) setting a second value of the input data, maintaining it substantially constant along at least one complete rotation of the measurement surface around said rotation axis.

Preferably said first value of the input data is different from said second value of the input data.

Preferably the method comprises: vii) detecting a second value of the output data at each position of the measurement surface, said second value of the output data corresponding to second value of the input data.

Preferably the method comprises: viii) calculating, at each position of the measurement surface, a relation between said second value of the output data and said first value of the output data.

The Applicant deems that the method according to the invention solves the described problems due to various factors. The reactions to the applied forces are generated by a fixed component such as the support plane; the abutted lateral portion is not deformed and hence does not affect the outcome of the control; the setting of said first value and said second value of input data, different from each other, allows obtaining a relation, preferably a "difference value", not constrained by each different tyre type and by the surrounding measurement conditions that potentially are always variable.

According to a different aspect, the invention relates to an apparatus for controlling tyres.

Preferably the apparatus comprises a support plane configured for receiving a tyre with axial middle line plane substantially parallel to the support plane, defining an abutted lateral portion and a free lateral portion arranged at a specific height with respect to said support plane.

Preferably the apparatus comprises a thrust element configured for applying, to a measurement surface of said free lateral portion of the tyre, a force directed towards the support plane.

Preferably the apparatus comprises a positioning actuator operatively associated with the thrust element and configured for moving said thrust element with at least one motion component perpendicular to a rotation axis of the tyre.

Preferably the apparatus comprises devices for modifying the angular position of the measurement surface with respect to a rotation axis of the tyre with regard to the free lateral portion.

Preferably the apparatus comprises a control unit programmed for:

detecting a first value of output data at each position of the measurement surface as a function of a first value of input data maintained substantially constant along at least one complete rotation of the measurement surface around said rotation axis, said output data corresponding to said force if said input data is the height of the free lateral portion of the tyre at each position of the measurement surface, or to said height if said input data is the force applied at each position of the measurement surface.

Preferably the apparatus comprises a control unit programmed for:

detecting a second value of the output data at each position of the measurement surface, said second value of the output data corresponding to a second value of the input data maintained substantially constant along at least one complete rotation of the measurement surface around said rotation axis.

Preferably said control unit comprises a module programmed for calculating, at each position of the measurement surface, a relation between said second value of the output data and said first value of the output data.

The Applicant deems that the apparatus according to the invention solves the described problems and allows the application of the aforesaid method. In particular, the support plane defines a fixed component capable of performing substantially constant reactions to the applied forces and the control unit is programmed for obtaining a relation, preferably a "difference value", not constrained by each different tyre type and by the surrounding measurement conditions that potentially are always variable.

The present invention in at least one of the aforesaid aspects can have at least one of the following preferred characteristics.

Preferably provision is made for comparing, at each position of the measurement surface, said relation between said second value of the output data and said first value of the output data with a discard threshold. The Applicant deems that such comparison is objective, having obtained a result that is not constrained by each different tyre type.

Still more preferably, provision is made for discarding or accepting the tyre as a function of said comparison.

The Applicant deems that the repeatability of the results allows an automatic selection of the tyres to be discarded.

Preferably said first value of the input data is maintained substantially constant along at least three complete rotations of the measurement surface around said rotation axis.

The Applicant deems that the application of the first value of the input data for at least three complete rotations of the measurement surface around said rotation axis allows rendering the test objective, preventing possible hysteresis and ensuring the stability of the control.

Preferably said second value of the input data is maintained substantially constant along at least two complete rotations of the measurement surface around said rotation axis.

The Applicant deems that the application of the second value of the input data for at least two complete rotations of the measurement surface around said rotation axis allows rendering the test objective, preventing possible hysteresis and ensuring the stability of the control.

Preferably said first value of the input data when related to said force is comprised between about 0.5 N and about 500 N.

The Applicant deems that such values allow executing a first arrangement step, during which the free lateral portion is arranged under the applied force such to cause only a slight deformation of the free lateral portion. Preferably said first value of the input data when related to said height is comprised between about 80 mm and about 600 mm.

The Applicant deems that such values allow executing a first arrangement step, during which the free lateral portion is arranged under an applied movement such to cause only a slight deformation of the free lateral portion.

Preferably said second value of the input data when related to said force is greater than the first value of the input data.

Preferably said second value of the input data when related to said force is comprised between about 0.6 N and about 600 N.

The Applicant deems that such values allow executing a second step in which the applied force is such to cause a considerable movement of the free lateral portion, in order to evaluate the response thereof in terms of, for example, rigidity.

Preferably said second value of the input data when related to said height is smaller than the first input data.

Preferably said second value of the input data when related to said height is comprised between about 70 mm and about 590 mm.

The Applicant deems that such values allow executing a second step in which the applied movement is such to cause a considerable reaction of the free lateral portion, in order to evaluate the response thereof in terms of, for example, rigidity.

Preferably said measurement surface is arranged at the axially external zone of the free lateral portion of the tyre.

The Applicant has been able to experimentally verify that such zone is that which, in an instrumental analysis, more greatly reveals the possible weakness of the free lateral portion.

Preferably said measurement surface is arranged at the zone of the free lateral portion of the tyre arranged at the greater height with respect to the support plane before the application of said force.

The Applicant has been able to experimentally verify that such zone is that which, in an instrumental analysis, more greatly reveals the possible weakness of the free lateral portion.

Preferably said tyre is inflated before the application of said force.

Preferably provision is made for tilting the tyre in a manner so as to invert the free lateral portion and the abutted lateral portion and to repeat the actions from ii) to viii).

More preferably provision is made for comparing said relation at each position of the measurement surface with a discard threshold.

Still more preferably, provision is made for discarding or accepting the tyre as a function of said comparison.

The Applicant deems that due to the arrangement and method applied, the verifications carried out on the two lateral portions are independent from each other and offer objective values.

Preferably provision is made for calculating an overall relation between the relation calculated on a lateral portion of the tyre at a specific position of the measurement surface and the relation calculated on the other lateral portion of the tyre at a position of the measurement surface symmetric with respect to said axial middle line plane.

The Applicant deems that, having obtained objective values for each lateral portion, it is possible to compare the data obtained at symmetric positions of the measurement surface and obtain an objective value of the tyre quality, allowing the identification of possible non-uniformities of the tyre.

More preferably provision is made for comparing said overall relation with a discard threshold.

The Applicant deems that such comparison is objective, having obtained a result that is not constrained by each different tyre type.

Still more preferably, provision is made for discarding or accepting the tyre as a function of said comparison.

The Applicant deems that the repeatability of the results allows an automatic selection of the tyres to be discarded.

Preferably provision is made for rotating the tyre around said rotation axis in order to modify the angular position of the measurement surface with respect to the rotation axis of the tyre, with regard to the free lateral portion.

The Applicant deems that such situation is optimal, since it allows simplifying the structure of the apparatus.

Preferably provision is made for continuously detecting the value of the output data at each position of the measurement surface.

The Applicant deems that the continuous detection can provide an overall characterisation of the tyre aimed not only to indicate the so-called "weak sidewall" defect, but also to identify possible non-uniformities of the free lateral portion and/or of the tyre.

Preferably said measurement surface is arranged at a substantially constant distance from the rotation axis.

The Applicant deems that the characterisation of the tyre along a specific circumference allows obtaining an objective and comparable value.

Preferably applying said force directed towards the support plane comprises:
 positioning a thrust element with respect to the free lateral portion at the vertical on the measurement surface;
 activating an approaching travel towards the free lateral portion, moving the thrust element closer to the tyre;
 detecting with a sensor the free lateral portion, stopping the approaching travel;
 activating a thrust travel of the thrust element against the free lateral portion.

The Applicant deems that the approaching and the thrust of the thrust element allow applying the method according to the invention on tyres of different size and type.

Preferably, each from among said first output data and said second output data, of which the relation is calculated, is that detected after at least two complete rotations of the measurement surface around said rotation axis, maintaining substantially constant said first and second input data.

The Applicant deems that this allows rendering the test objective, since the detection of the output data is carried out after an arrangement step and preventing possible hysteresis.

Preferably provision is made for comparing, at at least two different positions of the measurement surface belonging to the same lateral portion of the tyre, at least two values of the output data or at least two relations between said second value of the output data and said first value of the output data.

The Applicant deems that a characterisation of the tyre is possible that is aimed not only to indicate the so-called "weak sidewall" defect but also to identify possible non-uniformities of the free lateral portion.

Preferably said support plane is substantially horizontal.

Preferably said relation expresses a difference between said second value of the output data and said first value of the output data.

Preferably said relation expresses a ratio between said second value of the output data and said first value of the output data.

Preferably a thrust actuator is provided, operatively associated with the thrust element and configured for pushing the thrust element against the free lateral portion.

The Applicant deems that providing a specific thrust actuator can render the detection and comparison step independent from the step of arranging the apparatus as a function of the tyre type being tested.

Preferably an approaching actuator is provided, operatively associated with the thrust element and configured for moving the thrust element closer to the free lateral portion of the tyre.

The Applicant deems that the approaching of the thrust element allows applying the method according to the invention on tyres of different size and type.

Preferably a sensor is provided, configured for detecting the free lateral portion and stopping said approaching actuator.

The Applicant deems that the presence of a sensor facilitates and optimises the positioning of the thrust element at the measurement surface.

Preferably at least one first slide is provided, comprising said thrust element and operatively associated with said positioning actuator for positioning the thrust element with respect to the free lateral portion of the tyre.

Preferably said first slide comprises at least one second slide comprising said thrust element and operatively associated with said approaching actuator for moving the thrust element closer to the free lateral portion of the tyre.

BRIEF DESCRIPTION OF THE DRAWINGS

Further characteristics and advantages of the invention will be clear from the following description of a method and an apparatus for controlling tyres according to the invention, given as a non-limiting example with reference to the enclosed figures in which.

DETAILED DESCRIPTION OF THE INVENTION

With reference to the enclosed figures, reference number 1 indicates overall an apparatus for controlling tyres in accordance with the present invention.

Indicated with 2 is a support plane, preferably horizontal, configured for receiving a tyre 3 arranged with axial middle line plane 4 (FIG. 3) substantially parallel to the support plane. In particular, the support plane 2 comprises grips 2a adapted to block a radially internal portion of the tyre in order to render it integral with the support plane 2 itself.

The tyre 3 comprises (FIG. 3) a crown portion 5 arranged substantially perpendicular to the axial middle line plane, in a radially external zone of the tyre. Such crown portion 5 corresponds with a tread band 6, with portions of a crown structure 7 and with portions of a carcass structure 8 arranged radially internal with respect to the tread band 6.

Figure 3:
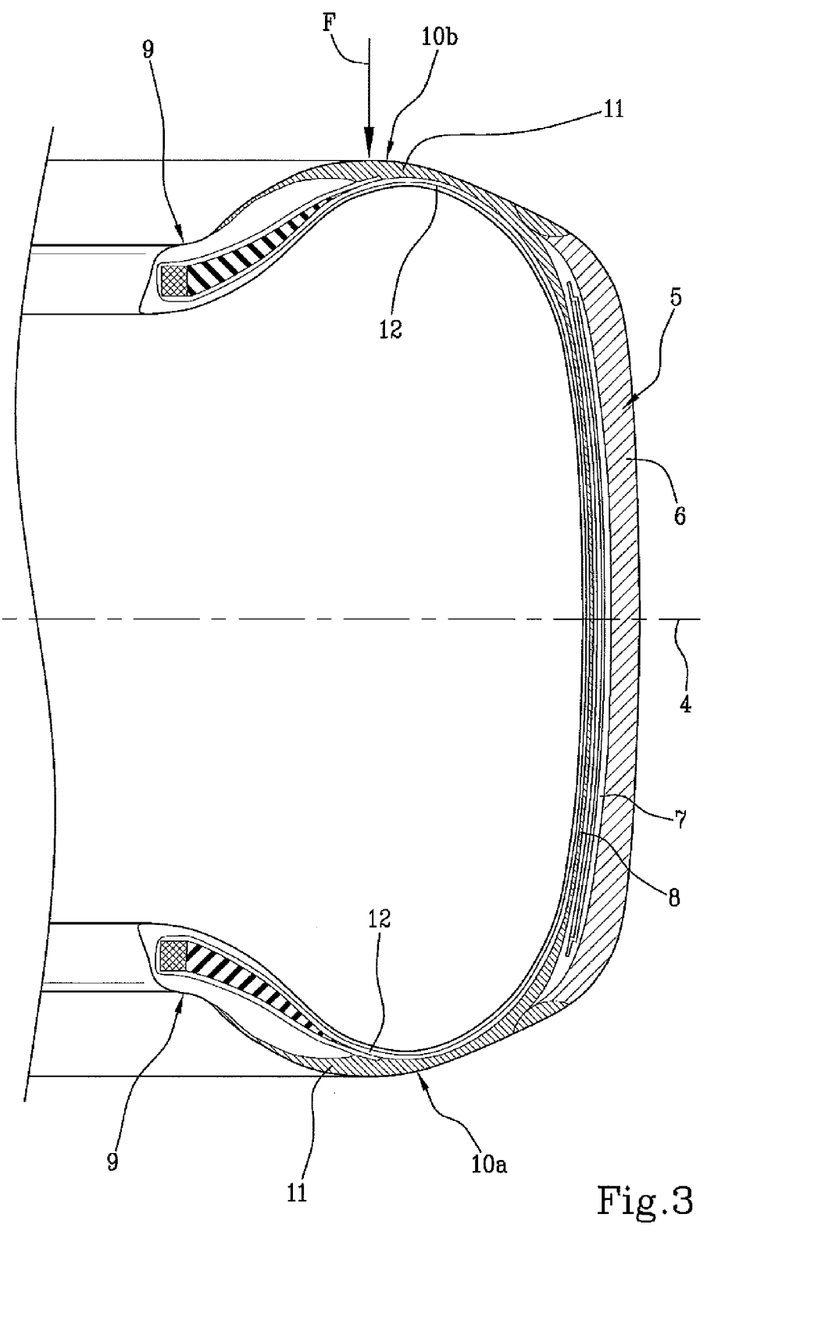
FIG. 3 is a schematic section view of a tyre as arranged in an apparatus according to the present invention.

The tyre 3 also comprises two anchorage portions 9 arranged radially internal and respectively on opposite sides of the axial middle line plane. The anchorage portions 9 are configured in a manner so as to be engaged with the rim of a wheel.

The tyre 3 also comprises two lateral portions 10a, 10b which are respectively extended on axially opposite sides of the axial middle line plane between each of the anchorage portions 9 and the crown portion 5. Each lateral portion corresponds with a sidewall 11 and with portions of the carcass 12 arranged in axially internal position with respect to the sidewall 11.

When the tyre 3 is abutted against the support plane 2, one of the two lateral portions of the tyre is directly in contact with the aforesaid support plane 2, defining an abutted lateral portion 10a. The other of the two lateral portions of the tyre is arranged at a specific height with respect to the support plane defining a free lateral portion 10b.

The support plane 2 is arranged within a framework 13, with respect to which it can rotate around an axis coinciding with a rotation axis X of the tyre abutted thereon. The apparatus 1 also comprises devices for rotating the support plane 2 with respect to the framework 13, not shown.

Figure 1:
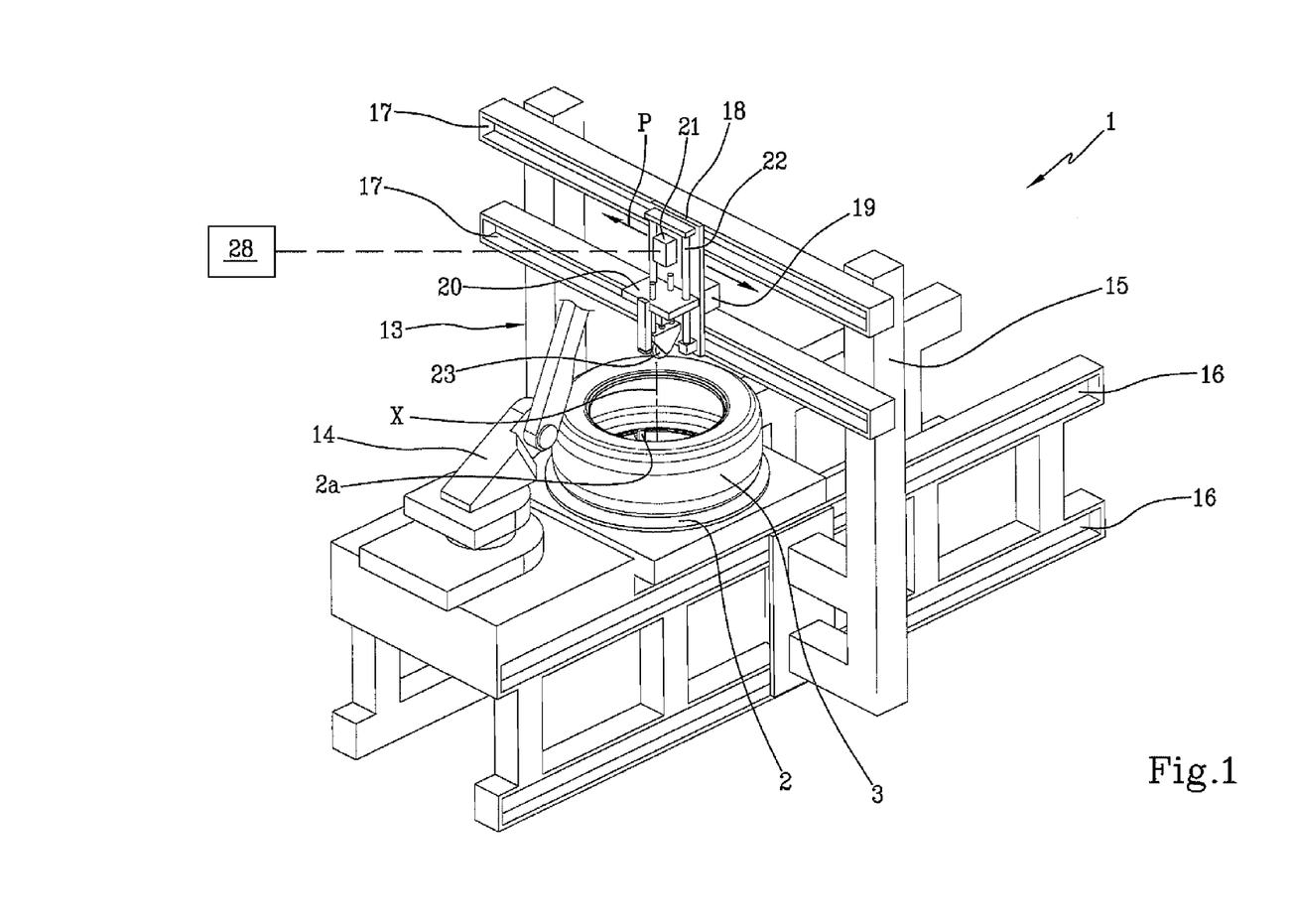
FIG. 1 is a schematic perspective view of an apparatus according to the present invention.
Figure 2:
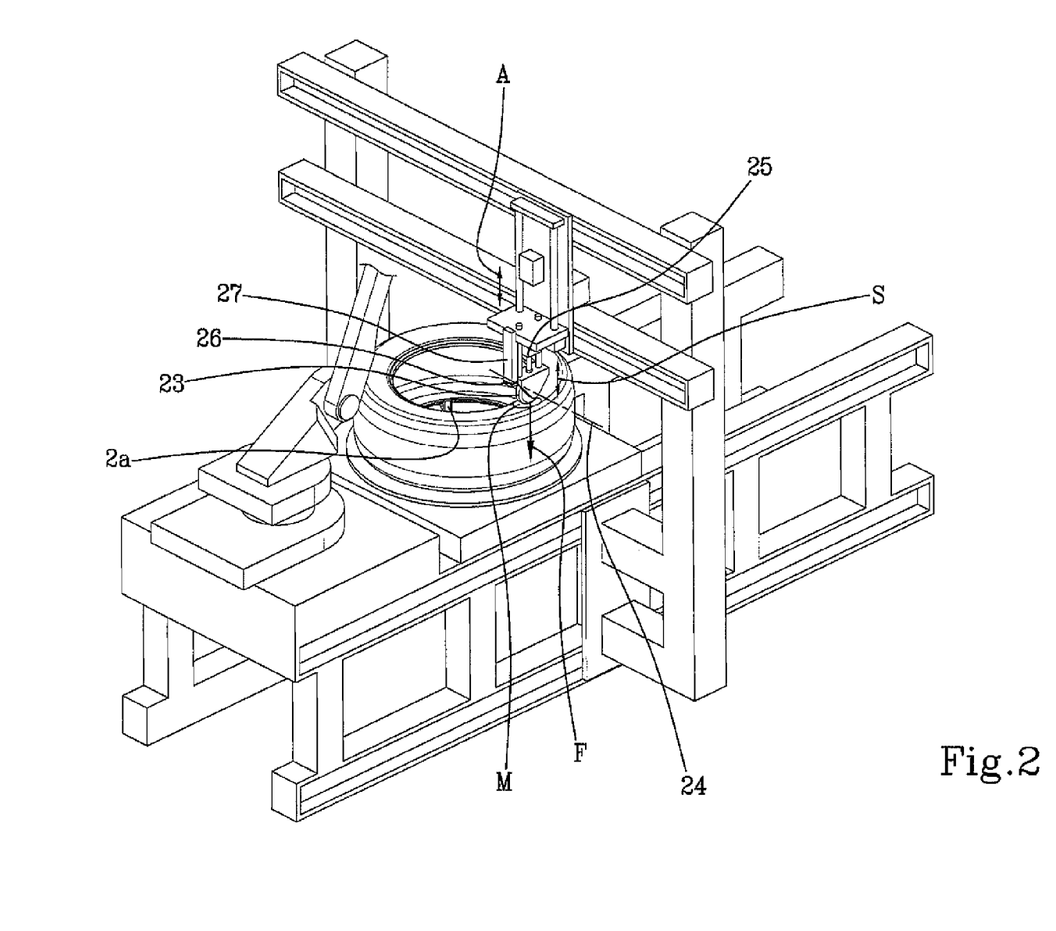
FIG. 2 is a schematic perspective view of the apparatus of FIG. 1 in a different operative condition.

The apparatus 1 can comprise, as in the embodiment illustrated in the enclosed figures, a device 14 for handling the tyre adapted to handle the tyre entering into the apparatus and exiting from the apparatus. In particular, FIGS. 1 and 2 illustrate a portion of an anthropomorphous robot adapted to handle the tyre entering into the apparatus and exiting from the apparatus.

More precisely, first guides 16 allow the sliding of the aforesaid support plane 2 for the positioning of the tyre to be controlled inside the apparatus 1.

Indicated with 15 is a portal guide of the framework 13, and arranged astride the support plane 2.

The portal guide 15 comprises second guides 17, preferably horizontal, adapted to be arranged on top of the support plane 2. The second guides 17 are operatively associated with a first slide 18, it too preferably horizontal.

The first slide 18 is operatively associated with a positioning actuator 19 interposed between the second guides 17 and the first slide 18 itself, in order to allow the movement thereof in the two senses along a positioning direction P perpendicular to the rotation axis of the tyre abutted against the support plane 2.

The first slide 18 comprises a second slide 20, preferably vertical, slidable on the first slide 18 due to the action of an approaching actuator 21. Indicated with 22 are third guides, preferably vertical, of the first slide 18 along which the second slide 20 translates in the two senses along an approach direction A.

The second slide 20 comprises a thrust element 23 configured for applying, to a measurement surface M of the free lateral portion 10b of the tyre, a force F directed towards the support plane 2.

Preferably the thrust element 23 comprises a small wheel arranged with rotation axis 24 preferably horizontal and, during use, oriented substantially according to a radial of the tyre abutted against the support plane 2.

The thrust element 23 is associated with the second slide 20 with interposition of a thrust actuator 25 operatively associated with the thrust element 23 itself and configured for pushing it against the free lateral portion 10b along a thrust direction S.

Indicated with 26 is a sensor configured for detecting the free lateral portion 10b, stopping the approaching actuator 21. The sensor is associated with the second slide 20 with interposition of a sensor actuator 27.

The first slide 18, the second slide 20 with the approaching actuator 21, the thrust element 23 with the thrust actuator 25 and possibly the sensor 26 with the sensor actuator 27 constitute a first group translating on the second guides 17, movable along the positioning direction P. In other words the first slide 18 comprises the thrust element 23 and is operatively associated with the positioning actuator 19 in order to position, preferably along the horizontal, the thrust element 23 with respect to the free lateral portion 10b of the tyre 3.

The second slide 20, the thrust element 23 with the thrust actuator 25 and possibly the sensor 26 with the sensor actuator 27 constitute a second group translating on the third guides 22, movable along the approach direction A. In other words the second slide 20 comprises the thrust element 23 and is operatively associated with the approaching actuator 21 in order to move, preferably along the vertical, the thrust element 23 closer to the free lateral portion 10b of the tyre 3.

The above-described actuators can be of any type (pneumatic actuators, oil-pressure actuators, electric actuators . . . ) preferably of cylinder type with movable piston.

During use, for example by means of handling device 14, a tyre 3 is arranged on the support plane 2 with axial middle line plane substantially parallel to the support plane itself, so as to define the abutted lateral portion 10a and the free lateral portion 10b.

In order to apply the force F directed towards the support plane 2 to the measurement surface M of the free lateral portion 10b, the thrust element 23 is positioned with respect to the free lateral portion 10b at the vertical on the measurement surface M. Then, an approaching travel towards the free lateral portion 10b is activated, moving the thrust element 23 closer to the tyre 3. Finally, a thrust travel of the thrust element 23 against the free lateral portion 10b is activated, preferably upon detection of the free lateral portion 10b by means of the sensor 26 so as to stop the approaching travel.

More in detail, the positioning actuator 19 is operatively associated with the thrust element 23 through the first slide 18 and the second slide 20 (and the relative actuators) and is configured for moving the thrust element 23 along the positioning direction P, i.e. with at least one motion component perpendicular to the rotation axis X of the tyre 29.

The translation of the first translating group (horizontal in the embodiment illustrated in FIG. 1) is carried out based on the size of the tyre being tested, until the thrust element 23 is positioned with respect to the free lateral portion 10b at the vertical on the measurement surface M. In other words, the translation of the first translating group is carried out until the radial position is reached corresponding to the desired measurement surface M. The measurement surface M is for example arranged at the zone of the free lateral portion 10b of the tyre arranged at the greater height with respect to the support plane 2 before the application of the force F. Preferably the measurement surface is arranged at the axially external zone of the free lateral portion 10b of the tyre.

The approaching actuator 21 is operatively associated with the thrust element 23 through the second slide 20 and the relative actuators and is configured for moving (vertically in the embodiment illustrated in FIG. 2) the thrust element 23 closer to the free lateral portion 10b of the tyre 3.

In other words, once the desired radial position has been reached, the approaching travel towards the free lateral portion 10b is activated through the approaching actuator 21, moving the thrust element 23 closer to the tyre 3 along the approach direction A.

With the sensor 26, the free lateral portion 10b is detected for stopping the approaching travel, blocking the approaching actuator 21 in the attained position.

Such position allows the thrust element 23 to come into contact with the free lateral portion 10b. The thrust actuator 25 is brought to the desired thrust pressure, in a manner so as to activate the thrust travel of the thrust element 23 against the free lateral portion 10b and exert the force F. The measurement surface M corresponds with the surface of the free lateral portion 10b in contact with the thrust element 23.

Possibly, the tyre can be inflated before the application of the force.

The support plane 2 is rotated around the rotation axis X of the tyre 3, maintaining the contact between the thrust element 23 and the free lateral portion 10b of the tyre being tested. The thrust element 23 maintains its position and the small wheel 24 rotates on the free lateral portion 10b. The devices for rotating the support plane 2 together with the grips 2a that retain the tyre integral with the support plane define an example of devices configured for modifying the angular position of the measurement surface with respect to the rotation axis X of the tyre and hence with respect to the free lateral portion 10b.

It is preferable that the measurement surface be arranged at a substantially constant distance from the rotation axis.

In accordance with one possible embodiment, the force F constitutes input data that is maintained substantially constant in the different control steps (described hereinbelow) of the tyre, in a manner so as to detect the height of the free lateral portion 10b of the tyre 3 at each position assumed by the measurement surface M. In this case, the height of the free lateral portion 10b of the tyre 3 constitutes an output data having values corresponding with each set value of the force in the different control steps.

For example, in order to detect the height of the free lateral portion 10b, the apparatus 1 can comprise a laser position transducer (not shown) adapted to detect the positions of the thrust actuator 25.

Figure 4:
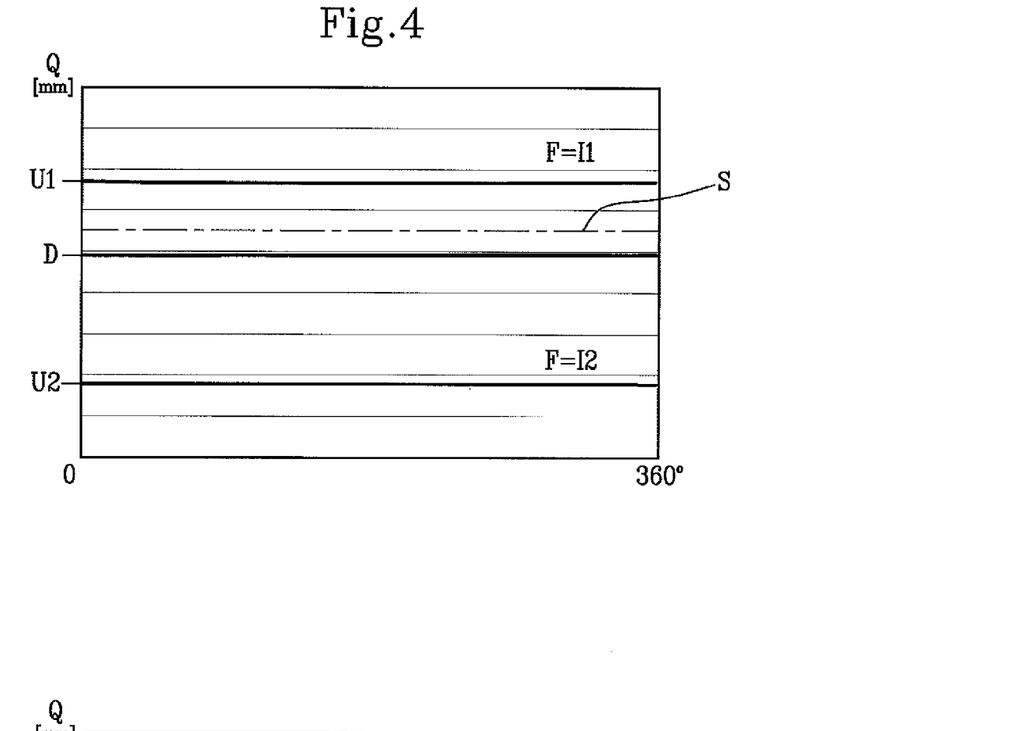
FIG. 4 and FIG. 5 are diagrams of two different tyres in which the abscissas report the angular position of a measurement surface of the tyre and the ordinates report the value of output data corresponding to the height of a free portion of the tyre following the application of a substantially constant force.
Figure 5:
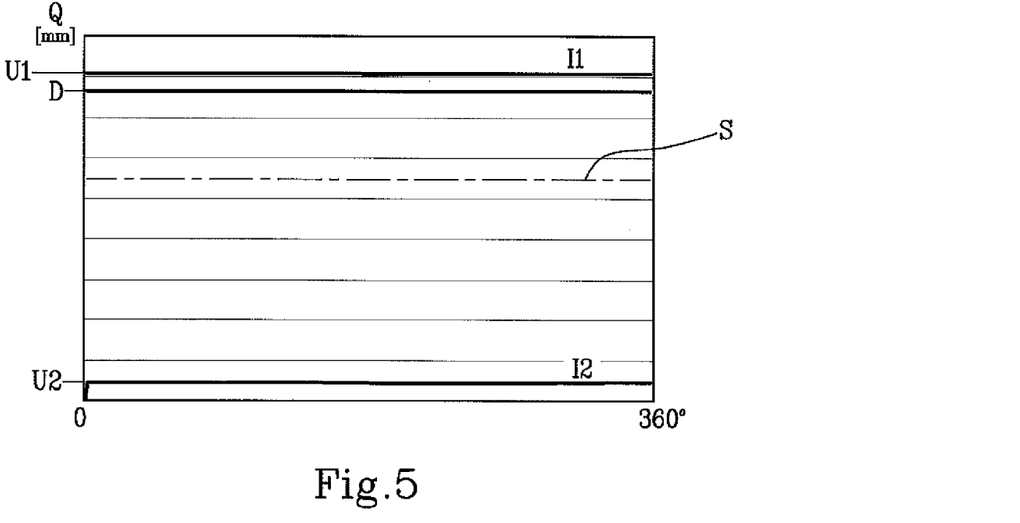

With reference to FIGS. 4 and 5, a method for controlling tyres according to the present invention is described hereinbelow.

In accordance with the above-described embodiment (constant force) the method for controlling tyres according to the present invention provides for setting a first value I1 of the applied force F and maintaining it substantially constant along at least one (preferably three) complete rotation of the measurement surface around the rotation axis. For example, the first value I1 of the applied force can be comprised between about 0.5 N and about 500 N, more preferably between about 10 N and about 20 N, in a manner so as to define a compression cycle of the free lateral portion 10b at low pressure. Alternatively, the first value I1 of the applied force can fall to a value only tied to the weight force of the thrust actuator cylinder.

During the application of the above-indicated first value I1, the free lateral portion 10b of the tyre is arranged under the exerted force.

During the rotation(s) of the tyre, and hence of the measurement surface, provision is made for detecting a first value U1 of the height Q of the free lateral portion 10b of the tyre at each position of the measurement surface M. In particular, provision is made for detecting a first value U1 of the height of the free lateral portion 10b of the tyre after at least two complete rotations of the measurement surface around the rotation axis.

Subsequently, a second value I2 of the applied force is set and maintained substantially constant along at least one complete rotation (preferably two complete rotations) of the measurement surface around the rotation axis X. The first value I1 of the force (first value of the input data) is smaller than the second value I2 of the force (second value of the input data). For example, the second value I2 of the applied force can be comprised between about 0.6 N and about 600 N, more preferably between about 120 N and about 150 N, in a manner so as to define a compression cycle of the free lateral portion 10b at high pressure.

During the application of the above-indicated second value I2, the free lateral portion 10b of the tyre undergoes a considerable movement (e.g. up to 5 cm) under the exerted force.

During the rotation(s) of the tyre, and hence of the measurement surface, provision is made for detecting a second value U2 of the height of the free lateral portion 10b of the tyre at each position of the measurement surface M. In particular, provision is made for detecting a second value U2 of the height of the free lateral portion 10b of the tyre after at least two complete rotations of the measurement surface around the rotation axis.

After having detected the two values of the height of the free lateral portion 10b, at each position of the measurement surface a relation D is calculated between the second value U2 and the first value U1. Preferably said relation D expresses the difference between the second value U2 and the first value U1. According to another preferred embodiment, the relation D expresses the ratio between the second value U2 and the first value U1. Advantageously the apparatus 1 comprises a control unit 28 programmed for detecting the first value U1 of the height at each position of the measurement surface as a function of the first value I1 of the applied force and for detecting the second value U2 of the height at each position of the measurement surface in which the second value U2 of the height corresponds to second value I2 of the applied force. In addition, the control unit comprises a module programmed for calculating, at each position of the measurement surface, the relation between the second value U2 of the height (second value of the output data) and the first value U1 of the height (first value of the output data).

Subsequently, provision is made for comparing, at each position of the measurement surface, the relation D between the second value U2 of the height (second value of the output data) and the first value U1 of the height (first value of the output data) with a discard threshold S in a manner so as to discard or accept the tyre as a function of the result of such comparison. According to a preferred embodiment in which the relation D expresses the difference between the second value U2 of the height and the first value U1 of the height, FIG. 4 corresponds with a tyre that is acceptable since the difference between the two heights is less than the discard threshold S, while FIG. 5 corresponds with a tyre to be discarded since the difference between the two heights is greater than the discard threshold S.

Advantageously the control unit can be programmed for performing the comparison between the relation D and the discard threshold S.

Preferably, provision can be made for continuously detecting the value(s) of the height (value of the output data) at each position of the measurement surface. In particular the value of the output data is detected for each angular position of the measurement surface, preferably maintaining constant the contact between the thrust element 23 and the free lateral portion 10b.

Possibly, provision can be made for comparing at least two relations D1 and D2 between the second value U2 of the height (second value of the output data) and the first value U1 of the height (first value of the output data) calculated at at least two different angular positions of the measurement surface belonging to the same lateral portion of the tyre. Alternatively, provision can be made for comparing at least two values of the height (e.g. the second value of the output data) at at least two different angular positions of the measurement surface belonging to the same lateral portion of the tyre.

Figure 6:
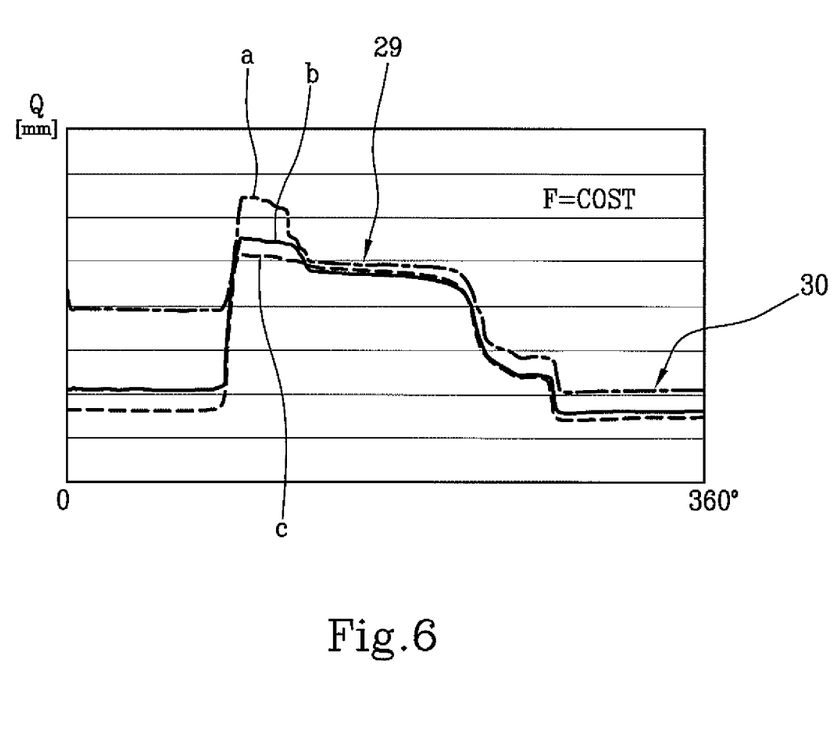
FIG. 6 is a diagram in which the abscissas report the angular position of a measurement surface of the tyre and the ordinates report the value of output data corresponding to the height of a free portion of the tyre following the application of a substantially constant force corresponding with the number of rotations of the tyre.

As illustrated for example in FIG. 6, a force F is applied that is substantially constant and the height of the free lateral portion is detected for three or more rotations of the tyre around the axis X. In the scope of the same free lateral portion, the angular zone 29 corresponds with a more rigid part which, under the action of the force F, is arranged at a specific height, while the zone 30 corresponds with a less rigid part that, under the action of the same force F, is arranged at a lower height. In this case, therefore, a non-uniformity is detected of the free lateral portion itself.

FIG. 6 also illustrates that the value of the output data and hence of the heights is stabilised starting from the third rotation of the tyre, given that several curves corresponding to subsequent tyre rotations have been indicated. In particular with a) the curve was indicated of the value of the output data and hence of the heights calculated at a first revolution of the tyre, with b) the curve was indicated of the value of the output data and hence of the heights calculated at a second revolution of the tyre, with c) the curve was indicated of the value of the output data and hence of the heights calculated at a third revolution of the tyre. It can be observed that in the passage from the first to the third revolution, the form of the curve has stabilised. From the fourth revolution on (not shown) the form of the curve is maintained nearly constant, substantially equal to the curve c) corresponding to the third revolution and with values of the output data slightly less than those of the curve c).

After having executed the test on a lateral portion of the tyre, it is possible to tilt the tyre in a manner so as to invert the free lateral portion and the abutted lateral portion and repeat the previously-described actions. Hence, results can be attained that are analogous to those of FIGS. 4-6 for each of the lateral portions of the tyre.

After having performed the test on each lateral portion of the tyre, it is possible to calculate an overall relation between the relation calculated on a lateral portion of the tyre at a specific position of the measurement surface and the relation calculated on the other lateral portion of the tyre at a position of the measurement surface symmetric with respect to the axial middle line plane. Subsequently, it is possible to compare the overall relation with a discard threshold in a manner so as to discard or accept the tyre as a function of the comparison.

Figure 7:
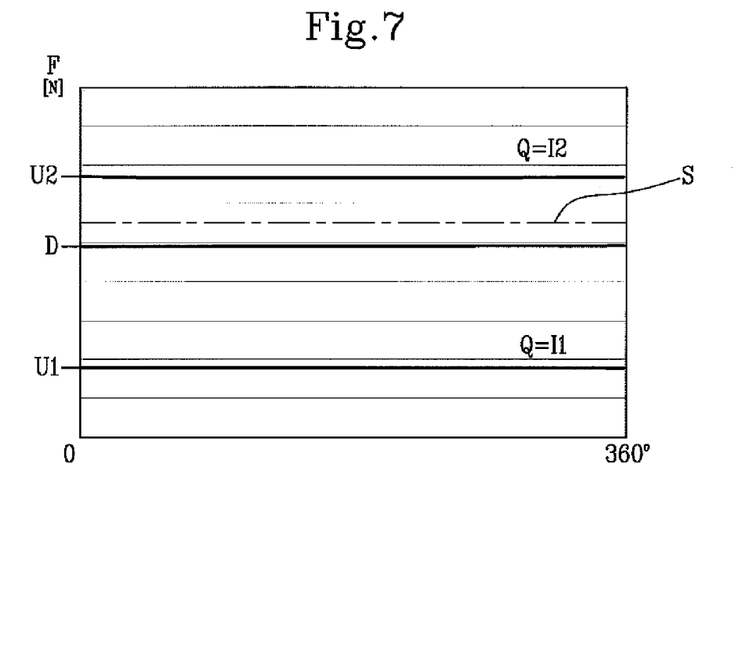
FIG. 7 and FIG. 8 are diagrams of two different tyres in which the abscissas report the angular position of a measurement surface of the tyre and the ordinates report the value of output data corresponding to the reaction force at the free portion of the tyre following the application of a substantially constant height.
Figure 8:
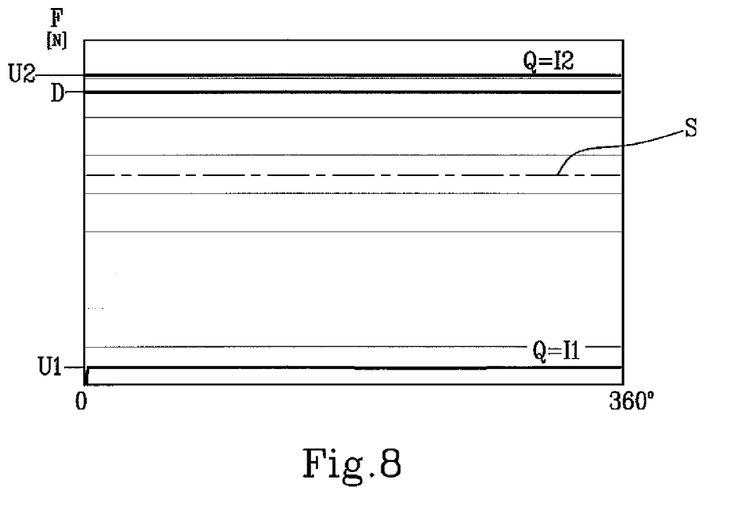

According to a different embodiment, the height of the free lateral portion 10b of the tyre 3 at each position assumed by the measurement surface M constitutes input data that is maintained substantially constant in the different tyre control steps, in a manner so as to detect the reaction of the free lateral portion. In this case, the force detected at the free lateral portion 10b of the tyre 3 constitutes output data having values corresponding to each set value of the height in the different control steps. That described above can analogously be applied if the input data is constituted by the height of the free lateral portion 10b of the tyre 3 at each position assumed by the measurement surface M. FIG. 7 and FIG. 8 illustrate the corresponding schemes in which:

I1 and I2 are respectively the first and the second value of the input data corresponding to a first height and a second height of the free lateral portion, in which I1 is greater than I2;

U1 and U2 are respectively the first and the second value of the output data corresponding to a first force and a second force performed by the free lateral portion;

D is the relation, in the specific case the difference, between U2 and U1.

In this case, when the relation D, i.e. the difference between U2 and U1, is compared with a discard threshold, the tyre is discarded when D is less than the discard threshold S (FIG. 7) while the tyre accepted when D is greater than the discard threshold (FIG. 8).

In general terms, provision is therefore made for:

setting a first value I1 of input data corresponding to the force or to the height at each position of the measurement surface, maintaining it substantially constant along at least one complete rotation of the measurement surface around the rotation axis X;

detecting a first value U1 of output data at each position of the measurement surface, in which the output data corresponds to the force if the input data is the height of the free lateral portion of the tyre at each position of the measurement surface, or to the height if the input data is the force applied at each position of the measurement surface;

setting a second value I2 of the input data, maintaining it substantially constant along at least one complete rotation of the measurement surface around the rotation axis X, in which the first value I1 of the input data is different from the second value I2 of the input data and preferably is adapted to determine an arrangement of the free lateral portion;

detecting a second value U2 of the output data at each position of the measurement surface, in which the second value U2 of the output data corresponds to the second value I2 of the input data;

calculating, at each position of the measurement surface, the relation D between the second value U2 of the output data and the first value U1 of the output data.

The invention claimed is:

1. A method for controlling tyres comprising:
   i) arranging a tyre on a support plane with axial middle line plane parallel to the support plane, defining an abutted lateral portion and a free lateral portion arranged at a specific height with respect to said support plane;
   ii) applying, to a measurement surface of the free lateral portion, a force directed toward the support plane;
   iii) modifying an angular position of the measurement surface with respect to a rotation axis of the tyre, with regard to the free lateral portion;
   iv) setting a first value of input data corresponding to said force or to said height at each position of the measurement surface, maintaining the measurement surface constant along at least one complete rotation of the measurement surface around said rotation axis;
   v) detecting a first value of output data at each position of the measurement surface, said output data corresponding to:
      said force if said input data is a height of the free lateral portion of the tyre at each position of the measurement surface,
      or to said height if said input data is the force applied at each position of the measurement surface;
   vi) setting a second value of the input data, maintaining the input data constant along at least one complete rotation of the measurement surface around said rotation axis, wherein said first value of the input data is different from said second value of the input data;
   vii) detecting a second value of the output data at each position of the measurement surface, said second value of the output data corresponding to the second value of the input data; and
   viii) calculating, at each position of the measurement surface, a relation between said second value of the output data and said first value of the output data.

2. The method for controlling tyres as claimed in claim 1, comprising comparing, at each position of the measurement surface, said relation between said second value of the output data and said first value of the output data with a discard threshold.

3. The method for controlling tyres as claimed in claim 2, comprising discarding or accepting the tyre as a function of said comparison.

4. The method for controlling tyres as claimed in claim 1, wherein said first value of the input data is maintained constant along at least three complete rotations of the measurement surface around said rotation axis.

5. The method for controlling tyres as claimed in claim 1, wherein said second value of the input data is maintained constant along at least two complete rotations of the measurement surface around said rotation axis.

6. The method for controlling tyres as claimed in claim 1, wherein said first value of the input data, when related to said force, is between about 0.5 N and about 500 N.

7. The method for controlling tyres as claimed in claim 1, wherein said first value of the input data, when related to said height, is comprised between about 80 mm and about 600 mm.

8. The method for controlling tyres, as claimed in claim 1, wherein said second value of the input data, when related to said force, is between about 0.6 N and about 600 N.

9. The method for controlling tyres, as claimed in claim 1, wherein said second value of the input data, when related to said height, is between about 70 mm and about 590 mm.

10. The method for controlling tyres, as claimed in claim 1, wherein said measurement surface is arranged at an axially external zone of the free lateral portion of the tyre.

11. The method for controlling tyres, as claimed in claim 1, wherein said measurement surface is arranged at a zone of the free lateral portion of the tyre arranged at a greater height with respect to the support plane before application of said force.

12. The method for controlling tyres, as claimed in claim 1, wherein said tyre is inflated before application of said force.

13. The method for controlling tyres, as claimed in claim 1, comprising:
   tilting the tyre in a manner so as to invert the free lateral portion and the abutted lateral portion; and
   repeating the actions from ii) to viii).

14. The method for controlling tyres as claimed in claim 13, comprising comparing said relation at each position of the measurement surface with a discard threshold.

15. The method for controlling tyres as claimed in claim 14, comprising discarding or accepting the tyre as a function of said comparison.

16. The method for controlling tyres as claimed in claim 13, comprising calculating an overall relation between a relation calculated on a lateral portion of the tyre at a specific position of the measurement surface and a relation calculated on the other lateral portion of the tyre at a position of the measurement surface symmetric with respect to said axial middle line plane.

17. The method for controlling tyres as claimed in claim 16, comprising comparing said overall relation with a discard threshold.

18. The method for controlling tyres as claimed in claim 17, comprising discarding or accepting the tyre as a function of said comparison.

19. The method for controlling tyres as claimed in claim 1, comprising rotating the tyre around said rotation axis in order to modify the angular position of the measurement surface with respect to the rotation axis of the tyre, with regard to the free lateral portion.

20. The method for controlling tyres as claimed in claim 19, comprising continuously detecting a value of the output data at each position of the measurement surface.

21. The method for controlling tyres as claimed in claim 1, wherein said measurement surface is arranged at a constant distance from the rotation axis.

22. The method for controlling tyres as claimed in claim 1, wherein applying said force directed toward the support plane comprises:
    positioning a thrust element with respect to the free lateral portion at vertical on the measurement surface;
    activating an approaching travel toward the free lateral portion, moving the thrust element closer to the tyre;
    detecting with a sensor the free lateral portion, stopping the approaching travel; and
    activating a thrust travel of the thrust element against the free lateral portion.

23. The method for controlling tyres as claimed in claim 1, wherein each from among said first output data and said second output data, of which the relation is calculated, is a relation detected after at least two complete rotations of the measurement surface around said rotation axis, maintaining constant said first and second input data.

24. The method for controlling tyres as claimed in claim 1, comprising comparing, at least two different positions of the measurement surface belonging to a same lateral portion of the tyre, at least two values of the output data or at least two relations between said second value of the output data and said first value of the output data.

25. The method for controlling tyres as claimed in claim 1, wherein said support plane is horizontal.

26. The method for controlling tyres as claimed in claim 1, wherein said relation expresses a difference between said second value of the output data and said first value of the output data.

27. An apparatus for controlling tyres comprising:
    a support plane configured for receiving a tyre with axial middle line plane parallel to the support plane, defining an abutted lateral portion and a free lateral portion arranged at a specific height with respect to said support plane;
    a thrust element configured for applying, to a measurement surface of said free lateral portion of the tyre, a force directed toward the support plane;
    a positioning actuator operatively associated with the thrust element and configured for moving said thrust element with at least one motion component perpendicular to a rotation axis of the tyre;
    devices for modifying an angular position of the measurement surface with respect to the rotation axis of the tyre, with regard to the free lateral portion; and
    a control unit programmed for:
        detecting a first value of output data at each position of the measurement surface as a function of a first value of input data maintained constant along at least one complete rotation of the measurement surface around said rotation axis, said output data corresponding to said force if said input data is a height of the free lateral portion of the tyre at each position of the measurement surface, or to said height if said input data is a force applied at each position of the measurement surface; and
        detecting a second value of the output data at each position of the measurement surface, said second value of the output data corresponding to a second value of the input data maintained constant along at least one complete rotation of the measurement surface around said rotation axis;
        and wherein said control unit comprises a module programmed for calculating, at each position of the measurement surface, a relation (D) between said second value of the output data and said first value of the output data.

28. The apparatus for controlling tyres as claimed in claim 27, wherein said support plane is horizontal.

29. The apparatus for controlling tyres as claimed in claim 27, comprising a thrust actuator operatively associated with the thrust element and configured for thrusting the thrust element against the free lateral portion.

30. The apparatus for controlling tyres as claimed in claim 27, comprising an approaching actuator operatively associated with the thrust element and configured for moving the thrust element closer to the free lateral portion of the tyre.

31. The apparatus for controlling tyres as claimed in claim 30, comprising a sensor configured for detecting the free lateral portion, stopping said approaching actuator.

32. The apparatus for controlling tyres as claimed in claim 27, comprising at least one first slide comprising said thrust element and operatively associated with said positioning actuator for positioning the thrust element with respect to the free lateral portion of the tyre.

33. The apparatus for controlling tyres as claimed in claim 32, wherein said first slide comprises at least one second slide comprising said thrust element and operatively associated with said approaching actuator in order to move the thrust element closer to the free lateral portion of the tyre.

* * * * *